United States Patent [19]  [11] 4,408,998
Mutsers et al.  [45] Oct. 11, 1983

[54] PROCESS FOR PREPARING THERMALLY STABLE AMMONIUM NITRATE-CONTAINING GRANULES

[75] Inventors: Stanislaus M. P. Mutsers, Geleen; Cornelis Hoek, Nieuwstadt; Gerardus M. C. Wagemans, Haelen, all of Netherlands

[73] Assignee: Unie Van Kunstmestfabrieken BV, Utrecht, Netherlands

[21] Appl. No.: 390,136

[22] Filed: Jun. 18, 1982

[30] Foreign Application Priority Data

Jun. 19, 1981 [NL] Netherlands ......................... 8102959

[51] Int. Cl.$^3$ .................................................. C06B 1/04
[52] U.S. Cl. .................................... 23/293 A; 71/59; 423/267; 423/396
[58] Field of Search ...................... 71/58, 59; 423/396, 423/267; 23/293 A

[56] References Cited

U.S. PATENT DOCUMENTS

| | | | |
|---|---|---|---|
| 2,739,036 | 3/1956 | Kamenjar | 71/59 |
| 2,782,108 | 2/1957 | Antle | 71/58 |
| 3,021,207 | 2/1962 | Stengel | 71/59 |
| 3,137,565 | 6/1964 | Hayes | 71/58 |
| 3,231,413 | 1/1966 | Berquin | 23/313 R |
| 3,379,496 | 4/1968 | Russo | 423/396 |
| 3,447,982 | 6/1969 | Minnick | 71/59 |
| 3,639,643 | 2/1972 | Mollerstedt et al. | 71/59 |
| 4,316,736 | 2/1982 | van Hijfte et al. | 71/59 |

FOREIGN PATENT DOCUMENTS 342303  1/1931  United Kingdom .................... 71/59

Primary Examiner—O. R. Vertiz
Assistant Examiner—Wayne A. Langel

[57] ABSTRACT

A process for preparing thermally stable ammonium nitrate-containing granules having high bulk density, high impact resistance, high crushing resistance and little or no tendency to cake by spraying a composition containing at most 5% by weight water, about 0.5% to 5% by weight of a insoluble and chemically inert silica-containing material, ammonium nitrate, and other components into a fluidized bed of ammonium nitrate seed particles thereby forming granules and recovering the thus formed ammonium nitrate-containing granulated product.

11 Claims, No Drawings

PROCESS FOR PREPARING THERMALLY STABLE AMMONIUM NITRATE- CONTAINING GRANULES

The invention relates to a process for preparing thermally stable ammonium nitrate-containing granules of high bulk density from a liquid composition containing a stabilization agent and ammonium nitrate.

An already process is described in, for instance, U.S. Pat. No. 3,379,496 in which a virtually water-free ammonium nitrate melt containing a finely divided, insoluble, and chemically inert clay stabilization agent, is granulated by the so-called prilling method.

Disadvantageously, this known process is considerably restricted as far as the product granule or particle size is concerned. Practically speaking, if larger diameter particles are desired then such processes require substantial capital investment in plant and equipment. For instance, production of granules having a diameter of more than 3 mm requires very high prilling towers or extremely forced cooling of the falling drops. With the increasing demand for larger-size granules, especially for so-called bulk blends, there also is a need for processes having a high flexibility in producing large and small product granule or particle sizes. A prilling process is therefore less attractive.

Another more recent known method for the preparation of ammonium nitrate granules is the so-called fluid-bed granulation process. This process enables a product with a larger granule size to be prepared. In this process, a liquid ammonium nitrate-containing composition is sprayed onto or into a bed of seed particles which bed is fludized by means of a gas flow. The seed particles increase in size as they are covered with coats of the materials solidifying out from the liquid phase being sprayed into or onto the seed particles. The thus formed granules are discharged from the bed.

A process for the preparation of thermally stable ammonium nitrate-containing granules with a high bulk density by means of fluid-bed granulation is known from U.S. Pat. No. 4,316,736, the disclosure of which is hereby incorporated by reference. According to this process, an ammonium nitrate-containing solution includes a maximum of 20% by weight, in particular 5% to 10% weight water, and 0.5% to 3% by weight magnesium nitrate. The temperature of the fluidized bed of seed particles is kept between 120° C. and 135° C. In order to obtain thermally stable granules in this process, it is necessary to cool the granules so slowly that in the range from 70° C. to 50° C. they remain virtually homogeneous in temperature.

A disadvantage of this known process is that the finished product has a rather high water content of about 0.3% by weight. In storage, granules having such a high water content show an increased tendency to cake and also exhibit poor hygroscopic behavior. In general this makes it necessary to apply rather a large quantity of a coating agent to the granules. In addition, such a product can hardly be stored or dispatched in bulk. Instead, closed moisture proof bags have to be used in shipping or storing the product.

Another disadvantage of this process is that the granules have to be cooled slowly in the temperature interval between 70° C. and 50° C., so that for a given quantity of product a relatively large cooling installation is required. Moreover, this cooling method necessitates the use of several, in general three, discrete cooling stages including one for cooling down to 70° C., another stage for cooling in the 70° C. to 50° C. range, and a further stage for cooling in the range below 50° C.

Finally, this known process has the additional disadvantage that the flexibility of operation, gauged, for instance, by the quantity of recycled material and hence production capacity, is limited by the narrow temperature range required for the bed of seed particles.

The present invention now provides a process which essentially avoids and/or overcomes the disadvantages of the above-mentioned process.

According to the present invention this is achieved by using an ammonium nitrate-containing melt including at most 5% by weight water and about 0.5% to about 5% by weight of a finely divided material, relative to the quantity of ammonium nitrate, which material contains silica and is insoluble in and chemically inert relative to the ammonium nitrate and spraying this melt into or onto a fluidized bed of ammonium nitrate-containing seed particles having a temperature of between about 95° C. and about 145° C., to form granules which are then discharged from the bed.

With the process according to the present invention a granular product is obtained which possesses high thermal stability and a high bulk density while having an extremely low moisture content such as less than 0.1% by weight. More particularly, the water content is less than 0.05% by weight. The granular product also has excellent impact and crushing resistance. Unlike granules produced by prior art processes, the granules produced according to the present invention hardly cake together and show hardly any hygroscopic tendencies. A particular advantage is that a product with a high bulk density, for instance 940 g/l, is obtained over a very wide seed bed temperature range. Consequently, a much higher degree of temperature-independence is achieved than with the known processes, which considerably enhances the flexibility of the present process.

In contrast with the process described in U.S. Pat. No. 4,316,736, it is unnecessary to employ slow cooling in the temperature range between 70° C. and 50° C. in the process according to the present invention. It is therefore possible to use a rapid cooling technique, for instance fluid-bed cooling, which allows an economization in cooling equipment.

Preferably in the present process an ammonium nitrate-containing melt including less than 1.5% by weight water is used. In particular, there is less than 0.5% by weight water in the melt.

A stabilization agent, may be selected from among any of the known agents that are inert to and insoluble in ammonium nitrate. Various suitable thermal stabilizing agents are described in U.S. Pat. No. 3,379,496, the disclosure of which is incorporated by reference herein.

Advantageously, a finely divided silica-containing material which is insoluble in and chemically inert with respect to ammonium nitrate can be used. Suitable silica-containing materials include, for example, various silica-containing clays. Preferably such clays have a particle size of less than 10 μm, in particular less than 5 μm. Such products are described for instance in U.S. Pat. No. 3,379,496, the disclosure of which is incorporated herein by reference. Commercially available silica-containing clays are suitable, such as, for example Sorbolite from Tennessee Mining and Chemical Corp. The silica-containing material may be added to the ammonium nitrate-containing melt as well as to the solution before evaporation. Preferbly about 1.5% to about 2.5% by weight of the silica-containing material relative to ammonium nitrate is used.

The temperature of the melt to be sprayed may vary. Preferably a temperature at least 5° C. higher than the crystallization temperature of the melt is used. In general, the maximum temperature of the melt should be lower than the temperature at which the melt boils at atmospheric pressure. For safety reasons, melt temperatures higher than about 180° C. are avoided. Thus, for example only, starting from a 98.5% by weight ammonium nitrate melt, a temperature of between 158° C. to about 180° C. is used, and, with a 99.5% by weight ammonium nitrate melt a temperature of between 168° C. and 180°0 C. is used. The temperatures suitable for the weight percent ammonium nitrate melt employed may be easily determined by simple experiment.

The melt can be sprayed onto the bed of seed particles, for example, by means of a single-phase spray. By preference the melt is sprayed into the bed. This can be done in a known way with a powerful, hot gas current, for instance in a two-phase spray. The spraying gas, for example only, air, is at a temperature which is about equal to or somewhat lower than that of the melt to be sprayed.

The quantity of spraying gas may vary. Preferably, quantities of gas and melt are used so that in the spraying device the mass ratio between the gas and the melt is about 1:1 to 1:4. By preference the melt is sprayed from the bottom upward into the bed.

The fluidization gas used is, in particular, air, passed through the bed from bottom to top. The quantity of fluidization gas to employ is difficult to precisely define but the gas should be both employed in such a quantity and supplied at such a rate that all seed particles in the bed are kept in a fluidized state. The quantity can be determined by simple experiment with a given sized seed bed. The superficial velocity of the fluidization gas is preferably kept at twice the minimum fluidization velocity (MFV). MFV is understood here to mean the minimum velocity that suffices to support the weight of the seed particles in the bed. In the case of ammonium nitrate with a mean particle size of, for example only, 3 mm this minimum fluidization velocity is about 1.2 m/sec. The appropriate velocity can readily be determined by those skilled in the art by simple experiment with a given particle size. However, the velocity of the fluidization gas should of course be less than that at which the individual seed particles are blown out of the bed.

The temperature of the fluidization gas may vary, for instance, between about 20° C. and 170° C. In general, the applied gas temperature in combination with the seed temperature and the seed quantity establishes the desired gas temperature. Suitable fluidization gas temperatures can be easily determined without difficulty.

In principle, all silica-containing ammonium nitrate particles can be used as seeds. By preference, particles obtained in upgrading the product from the fluidized bed are employed. Such a product is screened in a known manner, optionally after cooling, and the oversize granules are crushed. Advantageously, the crushed product is recycled along with the undersized granules to the fluidized bed as seed material. Depending on the quantity of seed particles required, only part of these crushed granules may be recycled. If this is desirable, the remainder is added for instance, directly to, or even after melting, to the liquid ammonium nitrate feed. When the quantity of granules available for recycling is too small, it is also possible to recycle part of the actual product granules, such product granules can be crushed if needed.

The quantity of recycled material may vary. It has been found that in the present process a quantity of the recycled material which is equal to, or even smaller than, the quantity of melt fed in the system is sufficient. Preferably, a quantity of recycled material is used such that the weight ratio between recycled material and melt is about 1:1 to 1:2.

The size of the seed particles supplied to the bed may also vary. By preference, seed particles with a mean diameter of between about 0.75 mm and 2.0 mm are used. The seeds fed in are fluidized in a known manner, for instance in a vessel with a perforated bottom. In general, the height of the bed is between 0.5 m and 1 m. Other dimensions can, of course, be employed.

In particular, the temperature of the bed, about 95° C. to about 145° C., is controlled by means of the temperature of the seeds fed in, e.g. recycle material, and of the fluidization gas. If a bed temperature in the upper part of the temperature range is desired, for instance about 120° C. to about 140° C., it is preferable to pre-heat the fluidization gas and/or not to cool the granules discharged from the bed, before screening and hence not to cool the recycle material. The pre-heating of the fluidization gas may be effected, for instance, through a heat exchange with the product granules after screening. An advantage of a high bed temperature, especially when a highly concentrated ammonium nitrate feed is used, is that it allows a better heat balance to be maintained in the process since cooling of the recycle material is not required. A disadvantage, however, is that the granules in the bed show an increased tendency to cake, and the crushing resistance of the granules deteriorates.

If a relatively low bed temperature is desired, for instance about 100° C. to about 110° C., it is possible, depending on the water content of the ammonium nitrate feed, to apply relatively cold fluidization gas and/or to cool either the granules discharged from the bed, prior to screening, or the material to be recycled. Since seed caking and the crushing resistance deterioration of the granules occur to a much lesser degree at lower bed temperatures, the process according to the invention is preferably applied with a relatively low bed temperature, such as, between about 100° C. to about 110° C.

The granules obtained in the bed are by preference discharged continuously from the bed, for instance, via the bottom or via an overflow.

Subsequently the granular product can be screened at once to obtain a product fraction with the desired grain sizes and a larger (oversize) and smaller (undersize) granular fraction, after which the product fraction is cooled down to the ambient temperature. It is also possible first to cool the granules discharged from the bed, for instance down to a temperature between the granulation and the ambient temperature, followed by screening the granular product, and, if necessary, to further cool the thus obtained product fraction.

The cooling of the granules can be effected by means of several known cooling methods. By preference, the cooling is effected in one or more fluid-bed coolers. This applies to the granules prior to screening as well as to the granules after screening. As indicated earlier, this offers the advantage that relatively limited cooling equipment is sufficient.

Moreover it has been found that rapid cooling of the granules in the process according to the present invention results in product of increased bulk density, while—in contrast with the product obtained in the process according to U.S. Pat. No. 4,316,736—no deterioration of the thermal stability occurs.

By preference, conditioned air at ambient temperature or at a slightly higher temperature is used as fluidization gas in the fluid-bed cooler(s). Advantageously, the heated air leaving the fluid-bed cooler can be used as the fluidization gas for the seed bed.

The air issuing from the bed of seed particles contains, besides water vapor, a small quantity of ammonium nitrate-containing dust. The dust can be removed in a known way, for instance by washing it with water or with a dilute ammonium nitrate-contining solution which is then recirculated.

If desired, the product granules obtained after screening and cooling can be further treated with a coating agent in any known way. The moisture content of the product obtained is so low that a drying stage can be omitted. The granules may be subjected to a further regular, rolling motion in a rotary drum, so as to effect an additional rise of the bulk density. This is preferably performed before the the cooling, particularly at a substantially constant temperature which is equal to or atmost 10° C. lower than the temperature of the fluidized granulation bed. The residence time in the rotary drum may vary between 1 and 10 minutes and is preferably between 2 and 5 minutes. Advantageously no air is passed through the rotary drum to avoid evaporation of water and cooling of the granules. An additional advantage obtained by this treatment as that the roundness of the granules is improved and hence the flowability of the product.

Although the present process has special importance for the preparation of ammonium nitrate granules, it can also be advantageously used for preparing granules containing other components besides ammonium nitrate, for instance fillers, such as marlstone or dolomite, plant nutrients, trace elements, various known agrochemicals such as, for example only, herbicides and the like, stabilizers other than silica-containing clay, as well as various known fertilizer salts, and/or a small quantity of calcium nitrate, as disclosed in our copending patent application Ser. No. 390,137 filed simultaneously herewith.

The invention will now be further elucidated in the following non-limiting examples which serve to illustrate various embodiments of the present invention.

EXAMPLE 1

To a circular fluid-bed granulator (diameter 45 cm) with a perforated bottom, containing a bed of $NH_4NO_3$ seed particles having a mean diameter of 2.9 mm, an ammonium nitrate melt was continuously supplied via a two-phase spray by means of a strong air current are sprayed laterally into the bed. The bed height was 40 cm. The melt contained 1.5% by weight, relative to $NH_4NO_3$, of a silica-containing clay, obtainable under the name of Sorbolite from Tennessee Mining and Chemical Corp. which clay contains mainly silica (73%) and alumina (14%) besides small quantities of $K_2O$ (0.5%), CuO (1.5%), $TiO_2$ (0.6%), $Fe_2O_3$ (2.9%) and MgO (0.8%). The balance of the Sorbolite is organic material. The bed was at a temperature of 143° C. and was fluidized by means of an upward air current supplied through the bottom plate. Via an overflow, granules were continuously discharged to a screen and there separated into a fine fraction (particle size less than 2 mm), a product fraction (particle size of about 2 mm to about 4 mm) and a coarse fraction (particle size greater than 4 mm). The coarse fraction was crushed on crusher rollers and continuously recycled to the bed together with the fine fraction.

The product fraction was rapidly cooled in a fluid-bed cooler to about 35° C. Part of this product was heated and cooled five times between 15° C. and 50° C.

The product conditions and the properties of the product obtained and of the product after five cycles are listed in Table I below.

EXAMPLES 2 THROUGH 5

In the same manner as described in Example 1, $NH_4NO_3$ melt was granulated in a fluidized bed of seed particles. The process conditions and the properties of the product obtained are also listed in Table I. In Examples 3, 4 and 5, 2.0% by weight of a silica-containing stabilizer as in Example 1 was used.

EXAMPLE 6

In the same manner as in Example 1, $NH_4NO_3$ melt, containing 1.2% by weight of water, was sprayed into a fluidized bed of seed particles with a temperature of 138° C.

The other process conditions were the same as in Example 1. The product obtained had a water content of 0.06% by weight and a bulk density of 930 g/l.

TABLE I

|  | Example 1 | Example 2 | Example 3 | Example 4 | Example 5 |
|---|---|---|---|---|---|
| process conditions |  |  |  |  |  |
| bed temp. (°C.) | 143 | 115 | 105 | 122 | 138 |
| $H_2O$ content of melt (% wt.) | 0.55 | 0.53 | 0.60 | 0.60 | 0.60 |
| melt temp. (°C.) | 172 | 176 | 171 | 176 | 173 |
| quantity of melt (kg/h) | 94 | 94 | 94 | 94 | 94 |
| temp. of spraying air (°C.) | 163 | 163 | 159 | 162 | 159 |
| quantity of spraying air (kg/h) | 78 | 78 | 80 | 80 | 81 |
| temp. of fluidization air (°C.) | 166 | 119 | 109 | 127 | 153 |
| quantity of fluidization air (kg/h) | 1180 | 1180 | 1180 | 1180 | 1180 |
| velocity of fluidization air (m/sec) | 2.68 | 2.51 | 2.44 | 2.55 | 2.65 |
| product quality |  |  |  |  |  |
| nitrogen content (% wt.) | 33.95 | 33.95 | 33.95 | 34.10 | 34.30 |
| $H_2O$ content (% wt.) | 0.05 | 0.07 | 0.09 | 0.08 | 0.01 |
| bulk density (g/l) | 950 | 945 | 920 | 935 | 930 |
| rolling capacity (% round) | 90 | 60 | 90 | 90 | 80 |
| impact resistance (%) | 100 | 100 | 100 | 100 | 100 |
| crushing strength (%) | 47 | 61 | 60 | 60 | 60 |
| oil-absorption capacity (% wt.) | 0.40 | 0.35 | 0.30 | 0.25 | 0.30 |
| $D_{50}$ (mm) | 2.90 | 2.65 | 2.15 | 3.20 | 2.15 |
| product after 5 cycles between 15° C. and 50° C. |  |  |  |  |  |
| crushing strength (bar) | 40 | 35 | 40 | 50 | 55 |
| oil absorption capacity (% wt.) | 0.40 | 1.20 | 1.30 | 1.70 | 1.20 |
| volume increase (%) | 2 | 5 | 7 | 9 | 2 |

What is claimed is:

1. A process for preparing thermally stable ammonium nitrate-containing granules of high bulk density, high impact resistance, high crushing resistance and little or no tendency to cake from a composition containing a stabilization agent and ammonium nitrate comprising the combination of steps of:
   (a) forming a fluidized bed of ammonium nitrate containing seed particles at a bed temperature of between about 95° C. to about 145° C.;
   (b) spraying a melt composition composed of ammonium nitrate and containing:

(i) at most about 5% by weight water; and
(ii) about 0.5% to about 5% by weight of a finely divided silica-containing material which is insoluble in and chemically inert to ammonium nitrate into said seed bed thereby forming ammonium nitrate-containing granules; and (c) discharging said granules from said bed and recovering said granules, said recovery including the rapid cooling of said granules.

2. A process according to claim 1, wherein said melt contains at most 1.5% by weight water.

3. A process according to claim 1 or 2, wherein said melt contains about 1.5% to about 2.5% by weight of said silica-containing material relative to the quantity of ammonium nitrate.

4. A process according to claim 1 or 2, wherein said silica-containing material has an average particle size of less than 10 μm.

5. A process according to claim 1 or 2, wherein said melt has a temperature that is at least 5° C. higher than the melt crystallization temperature.

6. A process according to claim 1 or 2, wherein said melt is sprayed into said seed bed by means of an air current, which air current has a temperature about equal to or slightly lower than that of said melt, at an air to melt mass ratio between about 1:1 and 1:4.

7. A process according to claim 1, wherein said discharged and recovered granules are subjected to further treatment comprising:

(i) screening said discharged and recovered granules to isolate a product granule fraction by separating out oversized and undersized granules;
(ii) crushing said oversized granules; and
(iii) recycling a portion of said crushed granules and said undersized granules to said fluidized bed as seed particles.

8. A process according to claim 7, wherein said treatment of said discharged granules further comprises cooling at least one of the group consisting of the discharged granules, the said granules subsequent to said screening, or said granules being recycled to said fluidized bed.

9. A process according to claim 8, wherein at least one gas fluidized bed cooler is employed for said cooling.

10. A process according to claim 8 or 9, wherein a portion of the gas from said gas fluidized bed cooler is used as the fluidization gas for said seed bed.

11. Process according to claim 1, wherein in said step (c) said recovery further includes, prior to said rapid cooling, subjecting said granules to a regular rolling motion in a rotary drum at a substantially constant temperature which is at most 10° C. lower than the temperature of said seed bed.

* * * * *